Patented Mar. 15, 1938

2,111,270

UNITED STATES PATENT OFFICE 2,111,270

METALLIFEROUS AZO DYESTUFFS AND A PROCESS FOR PRODUCING SAME

Friedrich Moll, Mannheim, and Fritz Lange, Ludwigshafen-on-the-Rhine, Germany, assignors to General Aniline Works, Inc., New York, N. Y., a corporation of Delaware No Drawing. Application June 21, 1935, Serial No. 27,816. In Germany July 3, 1934

12 Claims. (Cl. 260—12)

The present invention relates to complex metal compounds of azo dyestuffs and a process for producing same.

It is already known that 1-hydroxynaphthalene and its derivatives having free 2- and 4-positions may be coupled in both these positions with aromatic diazo compounds. In by far the most cases, the coupling takes place in the 4-position, while a coupling in the 2-position can only be obtained with difficulty and in many cases not at all. The azo dyestuffs which contain the azo groups in the 2-position of the naphthalene nucleus are, however, those which have special technical value.

We have now found that complex metal compounds of azo dyestuffs containing the radicle of 1-hydroxynaphthalenes in which the azo group is present in the 2-position of the naphthalene nucleus, can be prepared by coupling diazo compounds of aromatic amines which contain a hydroxyl, carboxylic or alkoxy group in ortho-position to the amino group, with 1-hydroxy-naphthalene-4-sulphonic acid or its derivatives having a free 2-position or by coupling the diazo compounds of 1-hydroxy-2-aminonaphthalene-4-sulphonic acid or its derivatives with any compounds which contain a hydroxyl group and are capable of being coupled in the position adjacent to the acid group, converting the dyestuffs resulting in either of the said methods into their complex metal compounds and then splitting off the sulphonic acid group from the 4-position of the naphthalene ring by treatment with acid or agents supplying acids.

The fact that this reaction proceeds smoothly with the azo dyestuffs containing metal and leads to unitary products is surprising because it is known that these azo dyestuffs when free from metals are readily decomposed by acids.

The nature and amount of the acid employed depend to a great extent on the remaining conditions of the reaction. The smaller the amount of acid or its degree of dissociation, the more must the temperature of the reaction be raised or the more must the duration of the reaction be extended. Both mineral acids and organic acids, as for example monochloracetic acid or trichloracetic acid, may be employed for splitting off the sulphonic acid group. In many cases it is preferable to work under pressure. The preparation of the complex metal compounds and the splitting off of the sulphonic acid group may be carried out in two separate operations, or the two stages may be combined in one operation.

By splitting off the sulphonic acid group from the metal complex dyestuffs an alteration in the shades is effected. The dyestuffs thus obtained are distinguished by an increased fastness to fulling and washing and also by a highly improved shade in artificial light. The after-treatment of the dyestuffs with acids may also be carried out under such mild conditions that the sulphonic acid group being in the 4-position of the naphthalene nucleus is only partially split off. Thus it is possible to produce mixtures of the unchanged metal complex dyestuff with the dyestuff from which the sulphonic acid group has been split off. The composition of these mixtures may be varied within a wide range corresponding to the desired shade.

In the case of dyestuffs which contain sulphonic acid groups in the 4-positions of both the coupling component and the diazo component, either one or both sulphonic acid groups may be split off. For example a dyestuff of symmetrical structure is obtained by coupling the diazo compound of 2-amino-1-hydroxynaphthalene-4,8-disulphonic acid with 1-hydroxynaphthalene-4,8-disulphonic acid, converting the resulting dyestuff into its complex metal compound and then splitting off the two sulphonic acid groups in the manner described.

Those dyestuffs which still contain sulphonic acid groups may be employed for the dyeing of wool, silk, leather, lacquers and the like. Those dyestuffs which are free from sulphonic acid groups are especially valuable as pigment dyestuffs.

The following examples will further illustrate how the invention may be carried out in practice but the invention is not restricted to these examples. The parts are by weight.

Example 1

203 parts of 1-methoxy-2-amino-4-chlor-5-nitrobenzene are diazotized and coupled in a neutral or alkaline medium with 330 parts of 1-hydroxynaphthalene-4,8-disulphonic acid. The dyestuff is filtered off by suction after 24 hours, made into a paste with water, rendered exactly neutral, mixed with a solution of 240 parts of chromium formate in water and diluted to about 10,000 parts. The whole is heated in a closed vessel for an hour at 120° C., for an hour at 125° C. and for an hour at 130° C. The vessel is then opened and the chromium compound formed is salted out with common salt. It is filtered off by suction, made into a paste with 8000 parts of 4 per cent sulphuric acid and heated for three hours under pressure at 135° C. After cooling the dyestuff has almost completely separated and is isolated in the usual manner. It dyes animal fibres a greenish blue shade of excellent fastness and good shade in artificial light. Contrasted herewith, the chromium complex dyestuff when isolated before the after-treatment with sulphuric acid and containing still the sulphonic acid group dyes wool reddish-blue shades which are bad in artificial light.

By reducing the duration of the after-treatment with sulphuric acid mixtures of unchanged dyestuff with the chromium complex compound from which the 4-sulphonic acid group has been split off are obtained. Thus a mixture of about 75 per cent of the chromium complex dyestuff with 25 per cent of the dyestuff free from the 4-sulphonic acid group yields a saturated navy-blue of good fastness and good shade in artificial light.

Example 2

The amount of dyestuff obtained according to Example 1 from 203 parts of 1-methoxy-2-amino-4-chlor-5-nitrobenzene and 330 parts of 1-hydroxynaphthalene-4,8-disulphonic acid is stirred, for each molecular proportion of dyestuff, with a solution of 1.2 molecular proportions of basic chromium sulphate containing about 2.5 equivalents of sulphuric acid for each atom of chromium. The liquid is then diluted to 10,000 parts and heated for an hour at 125° C., for an hour at 130° C. and, after the addition of 200 parts of sulphuric acid of 66° Bé., for five hours at 135° C. The same dyestuff as is described in Example 1 is obtained.

Example 3

156 parts of 4-chlor-2-amino-1-methoxybenzene are dissolved in 2000 parts of hot water and 290 parts of hydrochloric acid having a specific gravity of 1.16. After cooling with water the solution obtained is cooled down to from 0 to 5° C. by adding about 2000 parts of ice and diazotization is effected by slowly adding a solution of 69 parts of sodium nitrite in 250 parts of water. After about one hour the solution of the diazo compound thus obtained is caused to flow into a solution of 330 parts of 1-hydroxynapththalene-4,8-disulphonic acid and 150 parts of calcined sodium carbonate in 5000 parts of water. After the coupling is completed the dyestuff is filtered off by suction, the residue pasted with a small amount of water and rendered slightly acid to Congo red. A solution of 120 parts of chromium oxide ($Cr_2O_3$) employed as wet chromium hydroxide in 150 parts of sulphuric acid of 66° Bé. strength and 250 parts of water is then added to the dyestuff paste. The mixture obtained is made up with water to 10,000 parts and heated for one hour to 120° C., for an hour to 125° C. and finally for an hour to 130° C. The chromium-complex-dyestuff thus formed is salted out with 2500 parts of common salt and filtered off. The dyestuff containing chromium, in the moist state in which it is obtained, is made up once more with water to 10,000 parts and heated in a pressure tight vessel to 170° C. for 2 hours and the dyestuff is salted out again with common salt. In this treatment the residue of acid present in the moist chromium complex dyestuff from the chrominating process is sufficient to initiate the splitting off of the sulphonic acid group by which a further amount of acid is set free.

The dyestuff, before the after-treatment with acid, dyes violet shades and, after the after-treatment, reddish-blue shades of substantially improved fastness to washing.

Example 4

The dyestuff derived from the diazo compound of 239 parts of 1-amino-2-hydroxynaphthalene-4-sulphonic acid and 330 parts of 1-hydroxynaphthalene-4,8-disulphonic acid is stirred with a solution of 240 parts of chromium formate, diluted to 10,000 parts and boiled under reflux for four hours. About 200 parts of hydrochloric acid having a specific gravity of 1.17 are then added and the whole heated for four hours at 135° C.

The resulting dyestuff dyes animal fibres very fast shades.

Example 5

224 parts of 1-hydroxy-2-amino-4-chlorbenzene-6-sulphonic acid are diazotized and coupled with 250 parts of 1-hydroxynaphthalene-4-sulphonic acid. The dyestuff is salted out, filtered by suction and converted into its copper compound by boiling with an ammoniacal solution of 250 parts of copper sulphate. The copper compound is filtered off by suction after cooling, stirred with four times the amount of 4 per cent sulphuric acid and heated for five hours at 135° C. The resulting dyestuff dyes wool violet shades of excellent fastness.

Example 6

32 parts of 2-amino-1-hydroxynaphthalene-4,8-disulphonic acid are diazotized and coupled with 16 parts of beta-naphthol in an alkaline medium. The dyestuff is precipitated by acidification and filtered off by suction. The dyestuff is stirred with 800 parts of water and a solution of 12 parts of chromium oxide in 24 parts of 100 per cent formic acid and 50 parts of water is added; the whole is heated in a closed vessel for an hour at 115° C. and then for an hour at 120° C. The complex chromium compound formed is then salted out, filtered off by suction, stirred with 1000 parts of water and 40 parts of sulphuric acid of 66° Bé. strength and then heated for four hours in a closed vessel at 135° C. The dyestuff obtained is almost completely precipitated and is filtered off by suction. It dyes wool, silk and leather excellent fast blue shades. It is also suitable for coloring lacquers derived from cellulose esters or ethers or other artificial organic substances.

Example 7

32 parts of 2-amino-1-hydroxynaphthalene-4,8-disulphonic acid are diazotized and coupled with 19 parts of 1-phenyl-3-methyl-5-pyrazolone. When the coupling is completed, the dyestuff is separated by acidification and filtered off by suction. The dyestuff is stirred with 800 parts of water, a solution of 12 parts of chromium oxide in 24 parts of 100 per cent formic acid and 100 parts of water is then added and the whole heated in a closed vessel for an hour at 120° C. and for three hours at 130° C. The resulting complex chromium compound is salted out and then filtered off by suction. The chromed dyestuff is made into a paste with 1000 parts of water and again heated in a closed vessel for two hours at 150° C. and for two hours at 170° C. The slight amount of acid contained in the dyestuff is entirely sufficient for the splitting off of the one sulphonic acid group. The dyestuff is filtered off by suction after cooling.

The dyestuff dyes wool and silk Bordeaux-red shades of very good fastness. Contrasted with the complex chromium dyestuff which has not been after-treated and which dyes considerably more yellow shades, it dyes in full saturated colors on silk from a neutral or slightly alkaline bath.

*Example 8*

32 parts of 2-amino-1-hydroxynaphthalene-4,8-disulphonic acid are diazotized and coupled with 28 parts of 1-(3'-sulphophenyl)-3-methyl-5-pyrazolone. The resulting dyestuff is made into a paste with a solution of 24 parts of chromium formate, made up to 1000 parts with water and heated in a closed vessel for an hour at 120° C., for an hour at 125° C., for three hours at 130° C. and for further three hours at 150° C.

The resulting dyestuff dyes animal fibres very fast red-violet shades.

*Example 9*

The diazo compound derived from 24 parts of 1-hydroxy-2-aminonaphthalene-4-sulphonic acid is introduced in portions at room temperature into a solution of 28 parts of 1-(3'-sulphophenyl)-3-methyl-5-pyrazolone in 100 parts of water and 70 parts of caustic soda solution of 40° Bé. strength. After about twenty hours, the reaction mixture is acidified and the deposited dyestuff is filtered off. The dyestuff is then stirred with a solution of 12 parts of chromium oxide in 24 parts of 100 per cent formic acid, the whole made up to 1000 parts and then heated in a closed vessel for an hour at 120° C., for an hour at 125° C. and for another hour at 150° C. After cooling, the dyestuff is salted out with 250 parts of salt.

The separated dyestuff is filtered off, stirred again with 1000 parts of water and heated for two hours at 150° C. and for a further two hours at 170° C. When the reaction mixture is cooled the dyestuff separates in part; the separation is completed by the addition of 100 parts of salt.

The resulting dyestuff yields reddish blue dyeings of excellent fastness on wool.

*Example 10*

The diazo compound derived from 24 parts of 1-hydroxy-2-aminonaphthalene-4-sulphonic acid is introduced in portions into a solution of 25 parts of 2-hydroxynaphthalene-4-sulphonic acid in 100 parts of water and 70 parts of caustic soda solution of 40° Bé. strength. After about twenty hours the reaction mixture is neutralized with hydrochloric acid and the dyestuff salted out. The separated dyestuff is filtered off, stirred again with 1000 parts of water, mixed with a solution of 12 parts of chromium oxide in 24 parts of 100 per cent formic acid and then heated for an hour at 120° C., for an hour at 125° C. and for an hour at 130° C. The chromium complex compound is separated by the addition of 250 parts of salt, filtered off by suction and again stirred with 1000 parts of water. The whole is then heated for two hours at 150° C. and for two hours at 170° C. After cooling, the dyestuff is completely separated by the addition of 100 parts of salt.

It dyes wool and silk grey-blue shades.

What we claim is:—

1. The chromiferous azo dyestuff having the formula

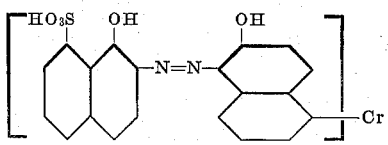

and which dyes wool fast blue shades.

2. In the process for the production of complex metal compounds of azo dyestuffs corresponding to the general formula

A—N=N—B wherein A stands for a cyclic radicle containing in ortho-position to the azo group a hydroxyl group, and wherein B stands for the radicle of a 1-hydroxynaphthalene having a free 4-position connected with the azo group in 2-position, the step which comprises heating in an aqueous medium complex metal compounds of azo dyestuffs of the general formula

A—N=N—B₁ wherein A has the above meaning, and wherein B₁ stands for the radicle of a 1-hydroxynaphthalene-4-sulphonic acid attached to the azo group in 2-position in the presence of acid reacting substances selected from the group consisting of mineral acids, strong organic acids and agents supplying such acids.

3. In the process for the production of complex metal compounds of azo dyestuffs corresponding to the general formula

A—N=N—B wherein A stands for a cyclic radicle containing in ortho-position to the azo group a hydroxyl group, and wherein B stands for the radicle of a 1-hydroxynaphthalene having a free 4-position connected with the azo group in 2-position, the step which comprises heating complex metal compounds of azo dyestuffs of the general formula

A—N=N—B₁ wherein A has the above meaning, and wherein B₁ stands for the radicle of a 1-hydroxynaphthalene-4-sulphonic acid attached to the azo group in 2-position in the presence of dilute mineral acid.

4. In the process for the production of complex metal compounds of azo dyestuffs corresponding to the general formula

A—N=N—B wherein A stands for a cyclic radicle containing in ortho-position to the azo group a hydroxyl group, and wherein B stands for the radicle of a 1-hydroxynaphthalene having a free 4-position connected with the azo group in 2-position, the step which comprises heating complex metal compounds of azo dyestuffs of the general formula

A—N=N—B₁ wherein A has the above meaning, and wherein B₁ stands for the radicle of a 1-hydroxynaphthalene-4-sulphonic acid attached to the azo group in 2-position in the presence of dilute strong organic acid.

5. In the process for the production of complex metal compounds of azo dyestuffs corresponding to the general formula

A—N=N—B wherein A stands for a cyclic radicle containing in ortho-position to the azo group a hydroxyl group, and wherein B stands for the radicle of a 1-hydroxynaphthalene having a free 4-position connected with the azo group in 2-position, the step which comprises heating in an aqueous medium complex metal compounds of azo dyestuffs of the general formula

A—N=N—B₁ wherein A has the above meaning, and wherein B₁ stands for the radicle of a 1-hydroxynaphthalene-4-sulphonic acid combined with the azo group in 2-position in the presence of a salt having a strong acid reaction.

6. In the process for the production of complex metal compounds of azo dyestuffs corresponding to the general formula

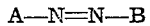

wherein A stands for a cyclic radicle containing in ortho-position to the azo group a hydroxyl group, and wherein B stands for the radicle of a 1-hydroxynaphthalene having a free 4-position connected with the azo group in 2-position, the step which comprises heating in an aqueous medium complex metal compounds of azo dyestuffs of the general formula

wherein A has the above meaning, and wherein B₁ stands for the radicle of a 1-hydroxynaphthalene-4-sulphonic acid attached to the azo group in 2-position in the presence of acid reacting substances selected from the group consisting of mineral acids, strong organic acids and agents supplying such acids at a temperature above 100° C.

7. In the process for the production of complex metal compound of azo dyestuffs corresponding to the general formula

wherein the B's stand for 1-hydroxynaphthalene radicles attached to the azo group in 2-position and having a free 4-position the step which comprises heating in an aqueous medium complex metal compounds of azo dyestuffs of the general formula

wherein the B₁'s stand for the radicle of a 1-hydroxynaphtalene-4-sulphonic acid connected with the azo group in 2-position with an acid reacting substance selected from the group consisting of mineral acids, strong organic acids and agents supplying such acids.

8. In the production of complex metal compounds of the azo dyestuff corresponding to the formula

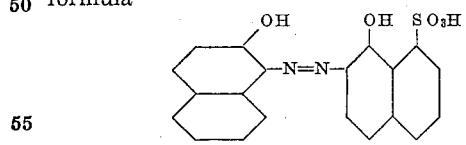

the step which comprises heating in an aqueous medium complex metal compounds of the azo dyestuff of the formula

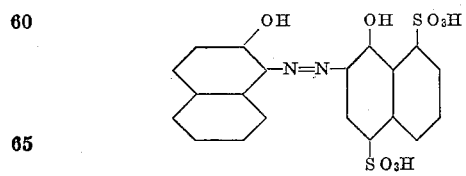

in the presence of acid reacting substances selected from the group consisting of mineral acids, strong organic acids and agents supplying such acids.

9. In the production of complex metal compounds of an azo dyestuff corresponding to the formula

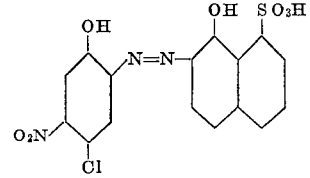

the step which comprises heating complex metal compounds of the azo dyestuff of the formula

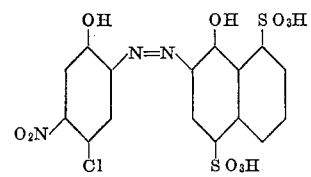

in the presence of acid reacting substances selected from the group consisting of mineral acids, strong organic acids and agents supplying such acids.

10. The chromiferous azo dyestuffs having the general formula

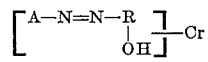

wherein A represents the radicle of a 1-hydroxynaphthalene attached to the azo group in 2-position containing a sulphonic acid group in the nucleus free from the hydroxy group, and wherein R represents the radicle of a cyclic coupling component which contains the hydroxy group in ortho-position to the azo group.

11. The chromiferous azo dyestuffs having the general formula

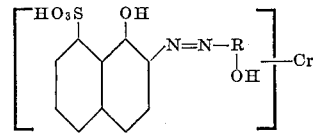

wherein R represents the radicle of a cyclic coupling component which contains the hydroxy group in ortho-position to the azo group.

12. The chromiferous azo dyestuffs having the general formula

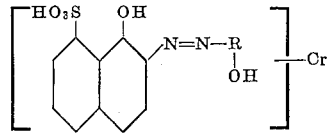

wherein R stands for a naphthalene radicle which contains the hydroxy group in ortho-position to the azo group.

FRIEDRICH MOLL.
FRITZ LANGE.